Feb. 12, 1963 C. L. STANCLIFF ETAL 3,077,187
INTERNAL COMBUSTION ENGINE WITH MEANS
FOR RELIEVING THERMAL STRESS
Filed May 2, 1960 11 Sheets-Sheet 2

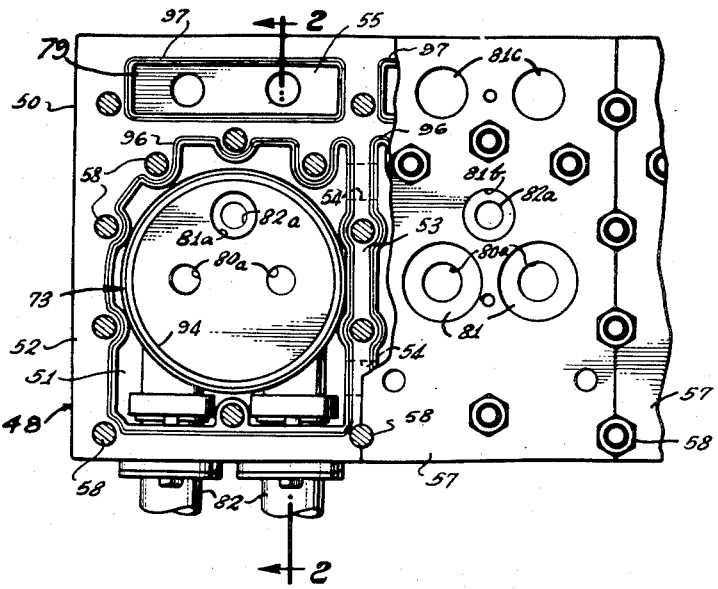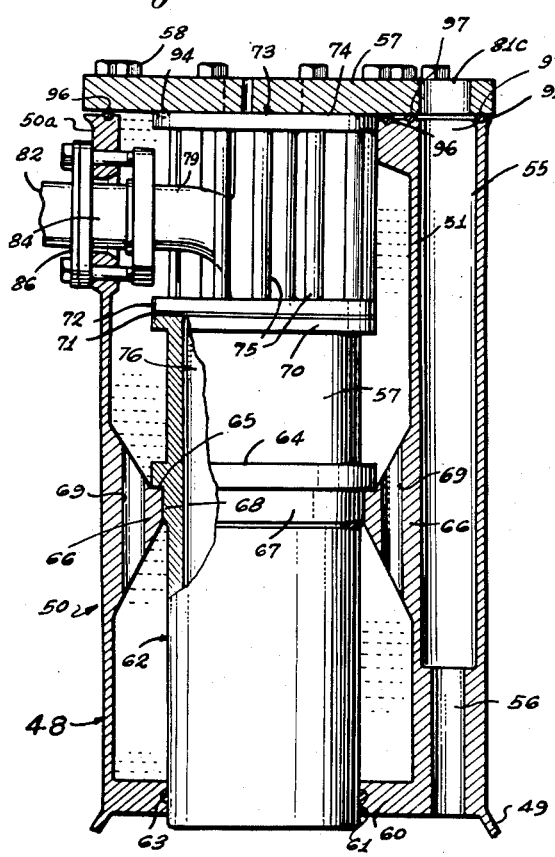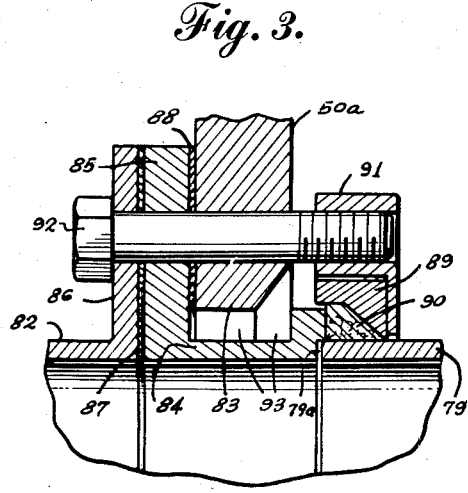

INVENTORS
Clifton L. Stancliff
Gerald W. Stancliff

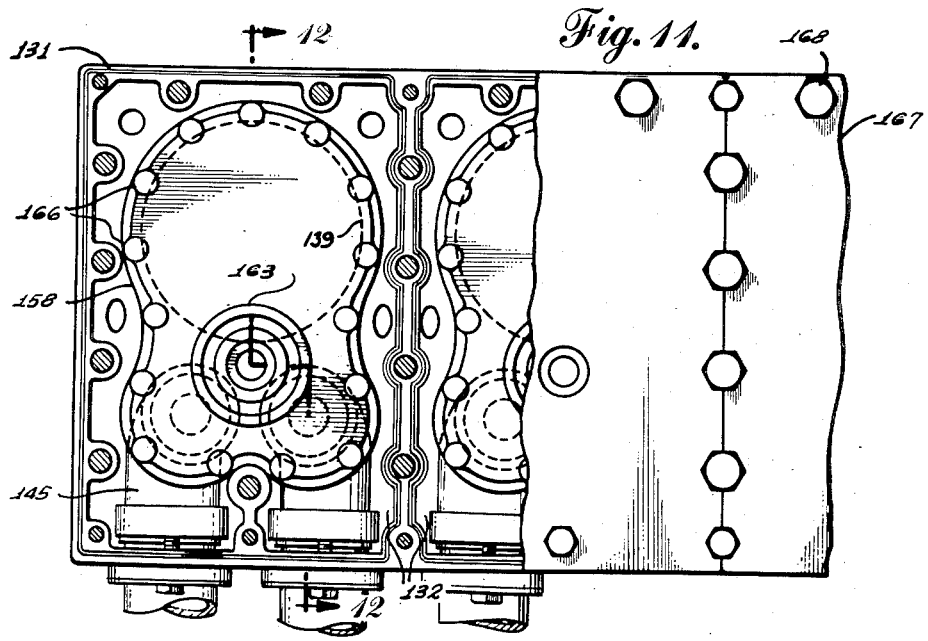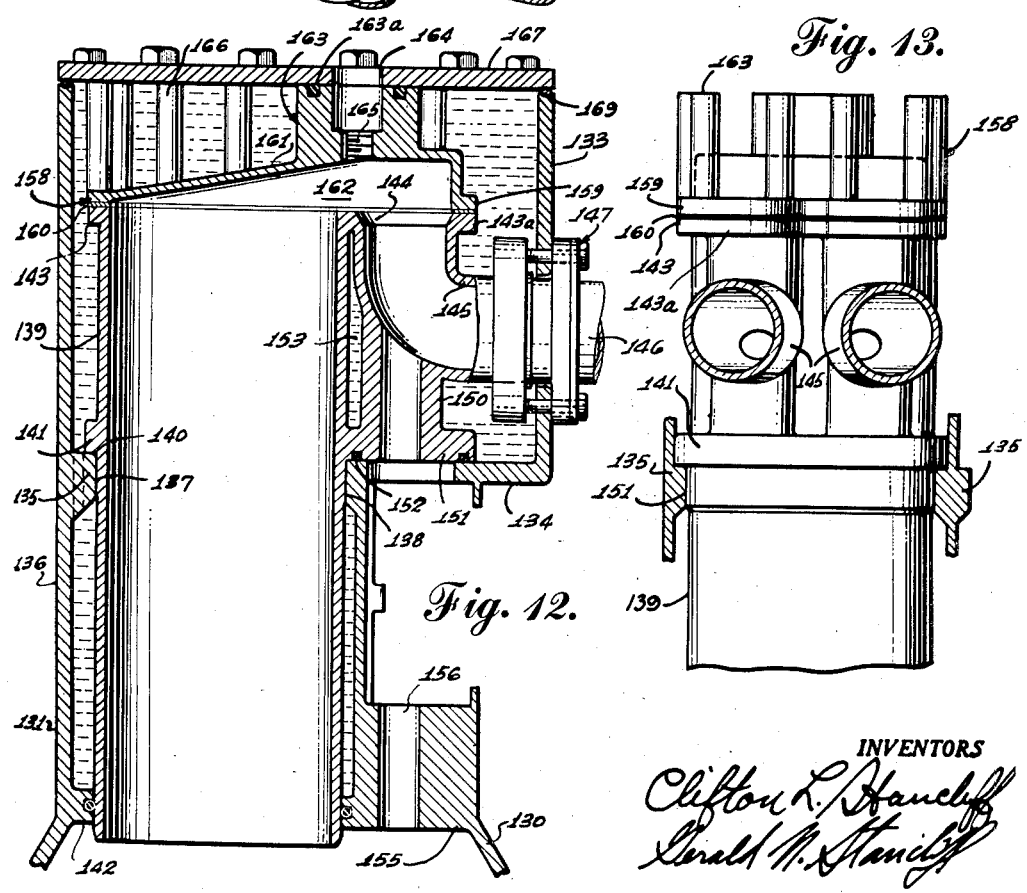

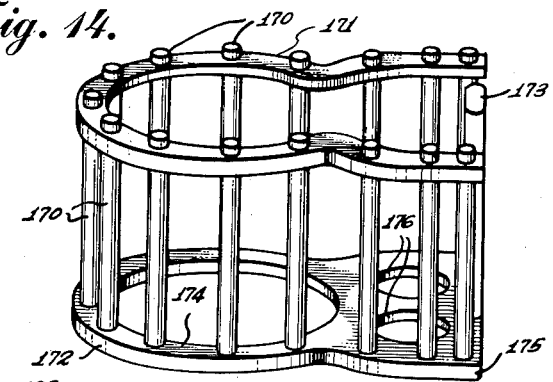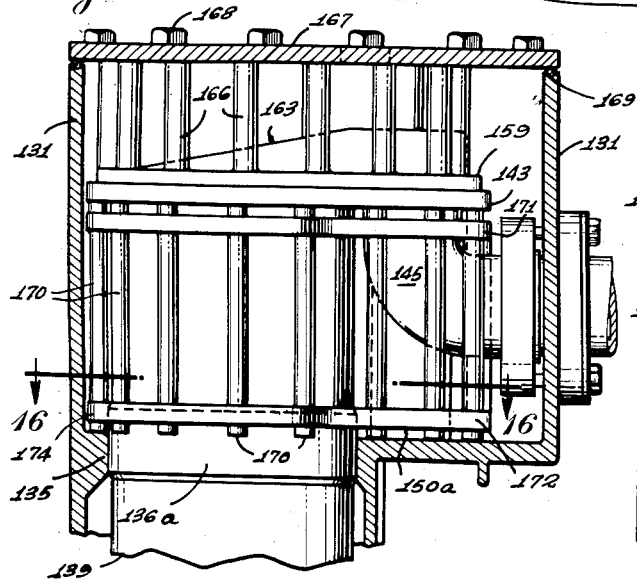

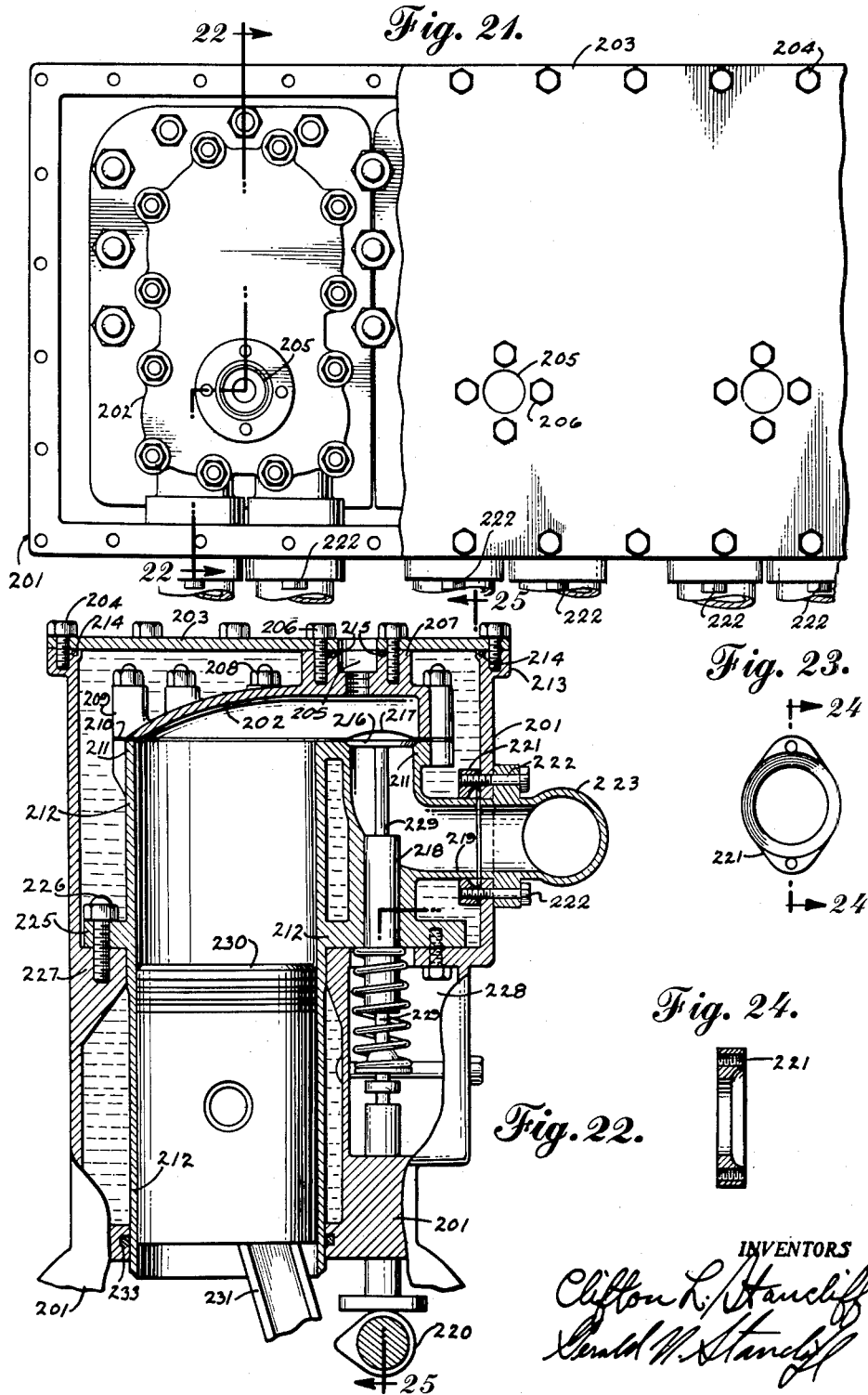

Feb. 12, 1963 C. L. STANCLIFF ETAL 3,077,187
INTERNAL COMBUSTION ENGINE WITH MEANS
FOR RELIEVING THERMAL STRESS
Filed May 2, 1960 11 Sheets-Sheet 8

INVENTORS
Clifton R. Stancliff
Gerald N. Stancliff

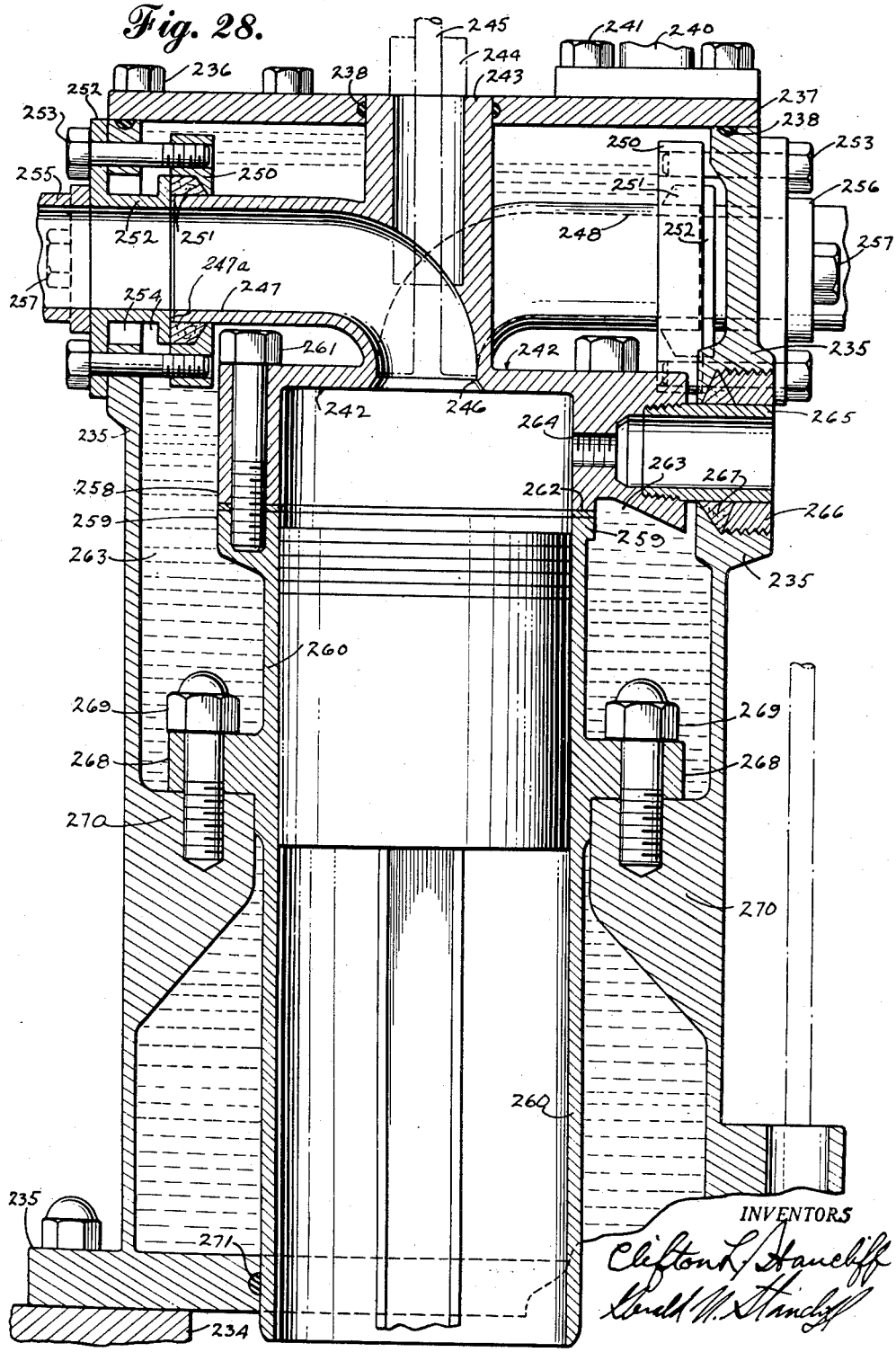

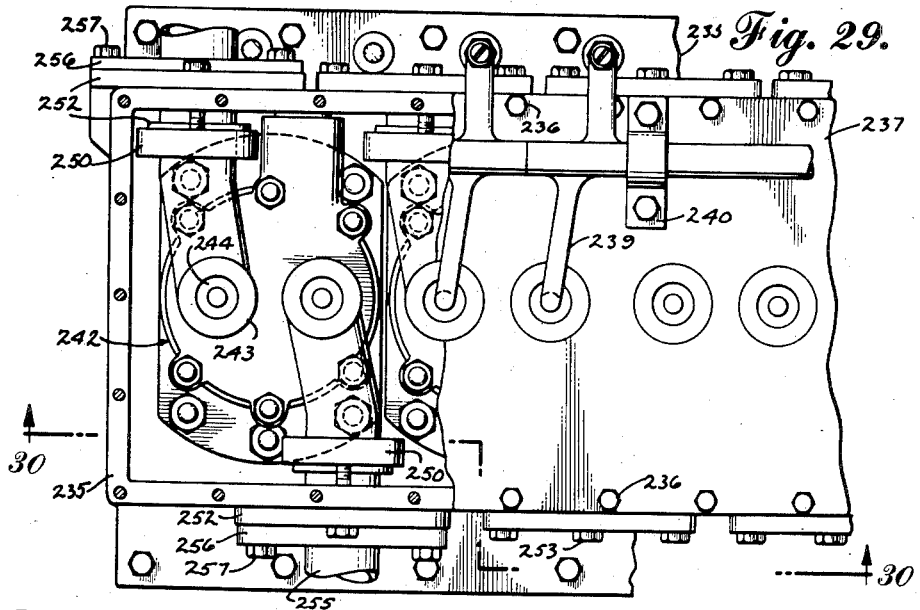

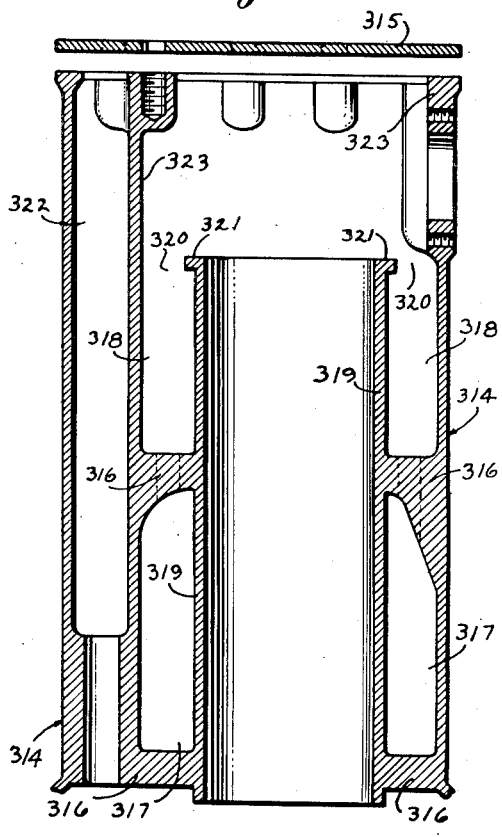
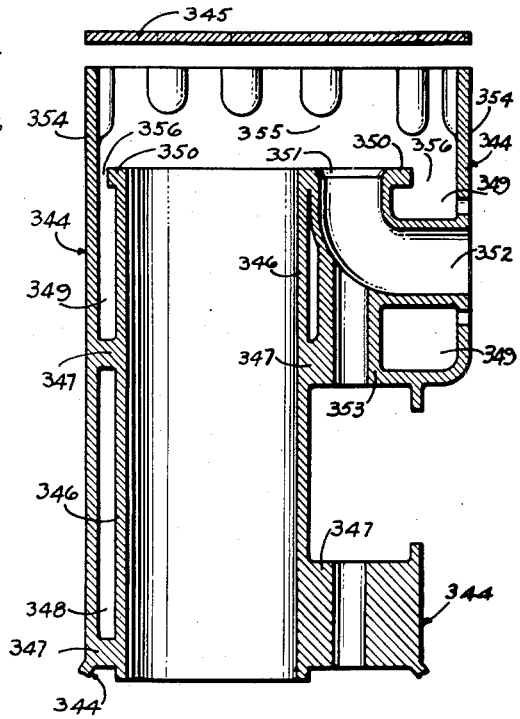

United States Patent Office 3,077,187
Patented Feb. 12, 1963

3,077,187
INTERNAL COMBUSTION ENGINE WITH MEANS
FOR RELIEVING THERMAL STRESS
Clifton L. Stancliff and Gerald N. Stancliff, Bakersfield,
Calif.; said Gerald N. Stancliff assignor to said Clifton
L. Stancliff
Filed May 2, 1960, Ser. No. 25,912
18 Claims. (Cl. 123—41.82)

This invention relates generally to liquid cooled internal combustion engines of the piston class, and is directed generally to improved cylinder block and cylinder head combinations wherein undesirable stresses resulting from thermal expansion of certain portions of the engine are alleviated.

Reference is here made to our copending application filed July 7, 1955, Serial No. 520,550, now abandoned, to our continuation application Serial No. 645,096 filed March 11, 1957, now Patent 2,944,336, issued July 12, 1960, and to our continution-in-part application Serial No. 844,367 filed October 5, 1959. The present application is a continuation-in-part of our copending application Serial No. 599,792, filed July 24, 1956, for Preventing the Occurrence of Adjacent and Abutting Conflicting Thermally Induced Stresses in the Upper Combustion Chamber Areas of Liquid Cooled Internal Combustion Engines, now abandoned.

In internal combustion engines as heretofore conventionally constructed, the upper portion of the cylinder barrel contained in the block, and the combustion chamber defining walls of the cylinder head, which are highly heated under running conditions, are embraced by outer, liquid-cooled, relatively cool running structure, with resulting high temperature gradients between the highly heated components and the cool running structure. Forces of thermal expansion developed within the highly heated components are opposed by the outer, cool-running embracing structures, resulting in troublesome unrelieved compressive stresses in the cylinder block and head. These stresses cause distortion and warping of both the head and block, occasional fractures, warping of valve seats into an out-of-round shape, and result in an overall engine performance which is below what could otherwise be realized, as well as reduced engine life.

A general object of the invention is therefore the provision of a liquid-cooled internal combustion engine structure in which highly expansive flame-contacted structure, in the region of the combustion chamber and the upper end of the cylinder barrel, is effectually mechanically isolated from surrounding cooler-running structures of minor expansion, so as to permit relatively free thermal expansion of the highly heated parts, and an absence of troublesome stresses owing to temperature gradients between the hot and cool portions of the engine.

A further general object of the invention is the provision of a multi-cylinder internal combustion engine having a novel and improved arrangement of block, with individual cylinders and individual cylinder heads therein.

An illustrative embodiment of the invention, of the valve-in-head type, involves individual cylinder sleeves mounted within coolant chambers of a cylinder block, and effectually mechanically isolated at their upper or combustion chamber ends from the walls of the block, so as to be free for unhampered lateral thermal expansion at their heated ends. The cylinder sleeves are mounted on the common block at a level spaced from the combustion chamber ends of the cylinder sleeves sufficiently far to be out of the highly heated area thereof, i.e., in a region wherein thermal expansion is virtually nil, or negligible. Substantial lateral forces of thermal expansion are thus not transmitted to the block through the mounting arrangements. On the top or combustion chamber end of each individual cylinder sleeve is an individual cylinder head including a combustion chamber defining head wall which is sealed to the upper end of the cylinder sleeve, and which is also effectually mechanically isolated from the walls of the block, so as to be free for unopposed lateral thermal expansion. The side walls of the block rise to substantially the level of the upper end of the cylinder head, so as to substantially surround the latter. The coolant chambers within the block thus surround both the individual cylinder sleeves and the individual cylinder heads. Finally, a cover plate is secured to the top of the block, and is utilized to hold the individual cylinder heads in position.

In the typical construction as thus outlined, the individual cylinder sleeves, which are preferably made individually removable from the block, and the combustion chamber head walls of the individual cylinder heads, are both unhampered for lateral thermal expansion at the combustion chamber level, i.e., at the level of the upper ends of the cylinder sleeves and of the combustion chamber head walls of the individual cylinder heads. These parts are therefore capable of lateral thermal expansion in correspondence with their degree of heat, and lateral stresses are not set up between these parts and the surrounding relatively cool walls of the block. The construction as described also has the important advantage of easy accessibility to the individual heads and cylinder sleeves, as well as easy individual removability for inspection or repair, or replacement.

A further feature and advantage of our individual removable cylinder is the provision of a landing or supporting base therefor at a location substantially best opposing the stresses and side thrust of the piston, connecting rod and crank.

A further important purpose of our invention is the provision of an individually removable cylinder sleeve which is tightly supported on or bolted to landing bosses so positioned and located as to absorb and substantially eliminate side vibration and the consequent deterioration, normally occurring after a period of time because of destructive conditions existing in unsupported portions in or near the mid section of the cylinder sleeve.

A further object of our invention is to provide an individual liquid cooled removable cylinder and cylinder head in which the areas subject to thermal gradients and the resulting stresses are substantially free to expand and contract in all directions and are not hindered by vertically or horizontally accumulated thermal stresses.

An important advantage of our invention is that the location of the landing or mounting bosses for our bolted type of cylinder sleeve and head permits unhindered side expansion and removes the restriction to vertical expansion because the upper part of the cylinder is not integrally connected to an unyielding immovable surrounding top plate.

A further advantage of our pressure plate type of individual separate cylinder sleeve and head is that the upper part of the cylinder sleeve and the lower part of the head are free to expand and contract in a transverse direction and are not held by horizontally accumulated thermal stresses.

An important object of our invention is the provision of individual pressure plate type cylinder sleeves and heads wherein not only is it possible for the separate individual cylinder sleeves and heads to react without a restrictive conecting plate to the thermal stresses acting in all directions in a horizontal plane, but where also means are provided by which vertical thermal stresses are susbtantially reduced or eliminated. This reduction of vertical thermal stresses is obtained not only in the cylinder sleeve area immediately below the cylinder head, but in the upper part of the cylinder head casting in which are integrally formed the exhaust ports. The actual device consists of a system of liquid-cooled vertical stress supporting studs or bars immediately surrounding both the top cylinder area subject to combustion flame and the cylinder head flame contacting surface and ports. The system of stress supporting bars is, in the case of the flame contacting cylinder and component parts area, placed between the underside of the rim flange at the upper end of the cylinder sleeve and the supporting bosses forming a part of the cylinder enclosure, which bosses are positioned well below the immediate area of high temperature combustion flames. In the case of the cylinder head and the integral ports, spark plugs and the other component parts, the bottom end of a similar system of supporting bars rests on the top surface of the cylinder head rim flange, while the top end of the supporting bars contacts and is pressed in position by the underside of the top cover or pressure plate secured to the cylinder enclosure.

Another important advantage of our invention is that there are no continuous contacting planes of connecting material between adjoining cylinders and the liquid coolant enclosure, since neither the cylinder sleeves nor the cylinder heads are provided with a continuous connecting integral plate having contacting bridges to each other or to the liquid coolant container.

A further purpose of our invention is the provision of an internal combustion engine which is provided with a liquid retaining enclosure not integrally connected to the individual cylinder heads but designed to cool the individual cylinders and cylinder heads by liquid circulation and not by heat dissipation through metallic connecting parts.

A further advantage of our invention is that the cylinder sleeve and head and suitable component valve parts, being free to expand or contract without restriction, deter the warpage of the valve seats in that the heads and component valve parts are not held by an outside ring of stiff metal, thus providing longer valve life because the valve seat is not forced out of round, and therefore the possibility of pressure leakage is reduced.

An important object of our invention is to provide a liquid cooled internal combustion engine having individual cylinders and heads in which higher efficiency in utilization of the heat units inherent in the fuel is made possible by the fact that the head itself may be operated under conditions of high temperature and reduced cooling action, because our separated and isolated individual cylinders and heads can expand and contract to a greater degree without being hindered by contact with the lower thermally induced expansion of the surrounding restrictive areas present in the contacting surfaces of conventional cylinders and heads.

An important object of our invention is to provide a liquid cooled internal combustion engine having non-replaceable individual cylinders of unitary and integral construction with the engine frame or crankcase casting, but which are separated by a surrounding open area from each of the other cylinders and the crankcase casting at the top ring or flange of the cylinder, and are supported by connecting webs positioned in the cooler area below the top rim or flange of the cylinder.

An important object of our invention is to provide a liquid cooled internal combustion engine having a cylinder head casting with non-replaceable inbuilt individual cylinder heads of unitary and integral construction, but with each head separated and isolated by a surrounding open area from each of the other heads and the cylinder head casting at the bottom surface area of the cylinder head, where it forms the high heat exposed top or cover of the combustion chamber, and with part of the remaining portion of each head integrally formed as a mounting base supported by the top cooler portions of the cylinder head casting.

Reference is now directed to the accompanying drawings showing a number of illustrative embodiments of the invention, and wherein:

FIG. 1 is a plan view of an engine in accordance with the invention, being in this case an overhead valve diesel engine, certain pressure or cover plate members being partially removed along with other overlying structure unnecessary to an understanding of the invention;

FIG. 2 is a section taken on line 2—2 of FIG. 1;

FIG. 3 is a detailed section through a port tube and manifold connector of the embodiment of FIGS. 1 and 2;

FIG. 11 is a plan view, with cover plate means partially broken away, of an L-head type of engine in accordance with the invention;

FIG. 12 is a section taken on broken line 12—12 of FIG. 11;

FIG. 13 is a front elevation of the cylinder sleeve and head of FIGS. 11 and 12;

FIG. 14 is a perspective view of a stud frame useful in connection with the engine of FIGS. 11–13;

FIG. 15 shows the stud frame of FIG. 14 installed in connection with the engine of FIG. 12;

FIG. 16 is a section taken on line 16—16 of FIG. 15;

FIG. 17 is a view similar to FIG. 13, but showing the stud frame of FIG. 14 installed in connection therewith, the sleeve casting being modified in minor respects to accommodate the stud frame;

FIG. 21 is a plan view, with parts broken away, of another modified form of the invention;

FIG. 22 is a section taken in accordance with broken line 22—22 of FIG. 21;

FIG. 23 is a detailed view of a packing gland used in the embodiment of FIG. 21;

FIG. 24 is a section taken on line 24—24 of FIG. 23;

FIG. 28 is a vertical transverse section through another modified engine in accordance with the invention being a view taken in accordance with broken line 28—28 of FIG. 30;

FIG. 29 is a plan view of the engine of FIG. 28, with certain parts broken away;

FIG. 30 is a section taken on broken line 30—30 of FIG. 29;

FIG. 31 is a transverse section through a modified form of the invention, showing the block and closure plate therefor, but without the cylinder head; and FIG. 32 is a transverse view through another cylinder block in accordance with the invention, the view showing also the block closure wall, but omitting the cylinder head.

Figure 4:
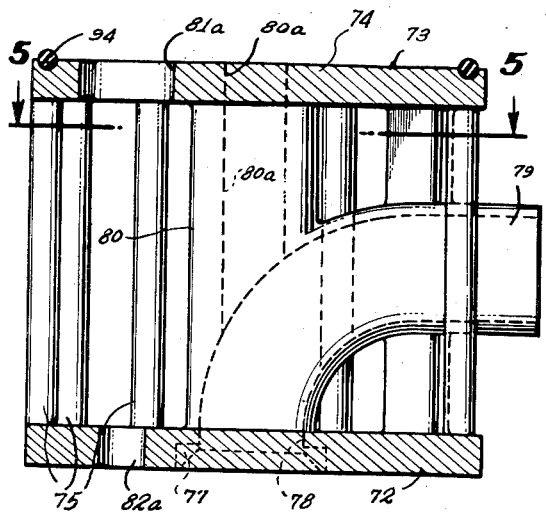
FIG. 4 is a detailed view, taken in accordance with line 4—4 of FIG. 5, of an individual cylinder head of the unit of the engine of FIGS. 1 and 2.

In the illustrative valve-in-head diesel engine of FIGS. 1–5, numeral 48 designates generally an engine frame, including a crankcase, fragmentarily indicated at 49, and a block 50 extending therefrom. The block 50 is divided into separate coolant-filled, open-topped cylinder-receiving compartments 51 by end and transverse partition walls 52 and 53, respectively, the latter having coolant ports 54. Formed in one side of block 50, opposite each compartment 51, is a valve rod chamber 55, opening through the top of the block, as shown, and extending downwardly from the bottom of each chamber 55 are bores 56 for valve lifter guide bushings, not shown.

Covers or pressure plates 57, secured to the top of the block by studs 58, cover the compartments 51 and associated valve rod chambers 55.

The compartments 51 are formed at the bottom with walls 60 provided with circular apertures 61, and received in the latter are the lower end portions of cylinder sleeves 62, sealed to walls 60 by O-ring seals 63.

Each cylinder sleeve 62 has, somewhat above its mid point, an exterior annular abutment flange 64, which seats down on an annular shoulder 65 on a cylinder support annulus 66 formed integrally with the defining side walls of compartment 51. As here shown, the cylinder sleeve 62 has, just below flange 64, a thickened annular wall section 67 which is machined for snug, slidable reception in the bore 68 of annulus 66. Sleeve 62 is thus vertically supported by shoulder 65, and laterally aligned by bores 61 and 68. Annulus 66 is shown to have coolant passages 69.

The upper or combustion chamber end of cylinder sleeve 62, which terminates substantially below the upper end of the block, has an external annular flange 70, and seated thereon, through gasket 71, is the annular bottom wall 72 of an individual, readily removable cylinder head 73. This cylinder head comprises, in addition to bottom wall 72, an annular top wall 74, and vertical stress supporting rods or studs 75 integral with and interconnecting walls 72 and 74. The upper side of wall 74 is normally slightly higher than the top plane of the block, and is engaged and pressed downward by pressure plate 57, suitable seals being provided as hereinafter more particularly described.

The combustion chamber 76 is defined by the upper portion of cylinder sleeve 62 and the bottom wall 72 of the cylinder head, and it will be appreciated that the highly heated portion of the cylinder sleeve is its upper extremity, the operating temperature being very substantially lower at the point of support on shoulder 65, which is well below the level of the upper end of the piston, not shown, throughout the stroke of the latter.

Lower head wall 72 is provided with the valve seats 77 surrounding ports 78, and formed integrally with wall 72 around these seats and ports are port tubes 79 having right angle turns, as shown, and coupled as presently to be described to exterior manifolds. Integral with port tubes 79 and with lower and upper head walls 72 and 74, and extending between the latter in axial alignment with valve seats 77, are tubular members 80 bored, as at 80a, to receive valve guide bushings, not shown. Fuel injector receiving apertures 81a and 82a are formed in cylinder head walls 74 and 72, respectively (FIGS. 1 and 4). The cover plates 57 are formed with bores 81 coaxial with but of larger diameter than valve guide bushing bores 80a in order to accommodate valve springs, not shown; and are further formed with injector receiving bores 81b, and with valve rod apertures 81c.

The two valve port tubes 79 are connected with exterior manifolds 82 as shown best in FIG. 3. Annularly spaced inside an aperture 83 in the thickened side wall portion 50a of the block is a connector sleeve 84 formed on its outer end with a flange 85 abutting manifold flange 86, with a gasket 87 interposed therebetween. The back side of flange 85 engages the exterior wall of the block through gasket 88. The inner end of sleeve 84 is counterbored to partially receive the extremity of port tube 79. A gland 89 contains packing ring 90 which engages the outside of tube 79 and the end of sleeve 84, and the packing ring is compressed by a cup ring 91 into which are threaded tightening studs 92 reaching in through flange 86, flange 85, and the side wall 50a of the block. It will be seen that an open coolant channel 93 is provided around connector sleeve 84.

As mentioned hereinabove, the upper plane of cylinder head 73 is elevated slightly above the top plane of the block. The pressure plate 57 engages the top of the cylinder head, and a pressure seal is effected by means of O-ring seal 94 seated in a groove in the top wall of the cylinder head. The pressure plate 57 is secured down to the block by means of studs 58, but a small clearance space 95 is provided therebetween to assure exertion of pressure on the top of the cylinder head. The space between the head and cover plate, around compartment 51, is sealed by an O-ring seal 96. A similar seal 97 seals around valve rod chamber 55.

Thus the pressure plate presses down on the top of the cylinder head 73, setting up compressive stress in the liquid cooled rods 75 to press cylinder head bottom wall 72 tightly on the gasketed upper end of cylinder sleeve 62. The compression continues downwardly through sleeve 62 to ring or flange 64 and thence to shoulder 65 on block annulus 66.

The upper end of the cylinder sleeve is thus effectually isolated from the block, and is free for unimpeded lateral thermal expansion and contraction when heated and permitted to cool. At the level of supporting annulus 66, the sleeve runs relatively cool, so it may fit with comparative snugness in bore 68. The lower end wall of head 73, comprising the upper end of the combustion chamber, and wherein its valve seats are located, is also unconfined and laterally isolated, and, therefore, free for lateral thermal expansion and contraction. This freedom for expansion permits substantially equal radial expansion of the valve seats in all directions, keeping them in "round" during running, thus assuring good valve seating, and freedom from burning. The stress rods 75 are cooled above the head wall 72, as are the port tubes. The exhaust port tube will, of course, operate at a somewhat elevated temperature notwithstanding liquid cooling. However, any lengthwise thermal expansion of this port tube is accommodated by the clearance space 79a—in effect, an expansion junction—provided between its extremity and the bottom of the counterbore in connector 84 (FIG. 3).

Figure 8:
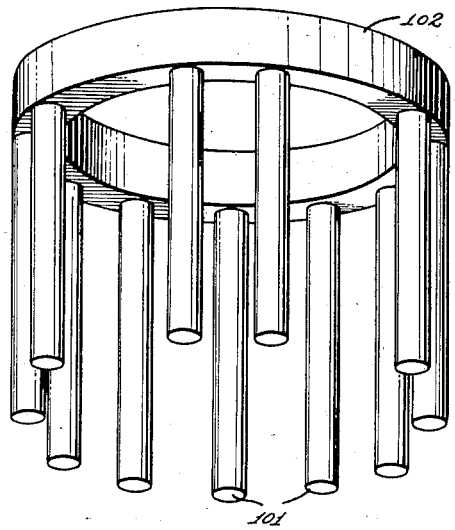
FIG. 8 is a perspective view of a stud frame which may be used in connection with the cylinder head unit of the engine of FIGS. 1–5.
Figure 9:
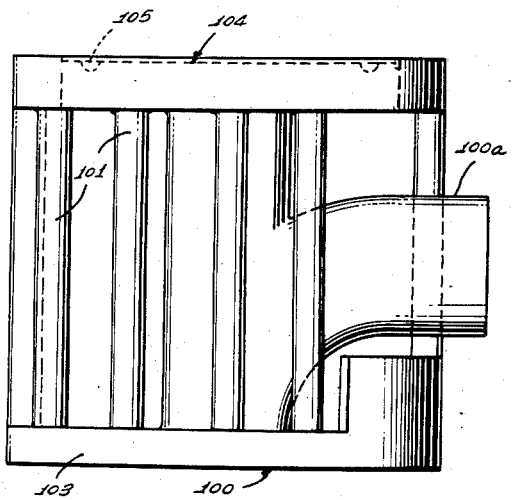
FIG. 9 shows the stud frame of FIG. 8 assembled with a cylinder head unit.
Figure 10:
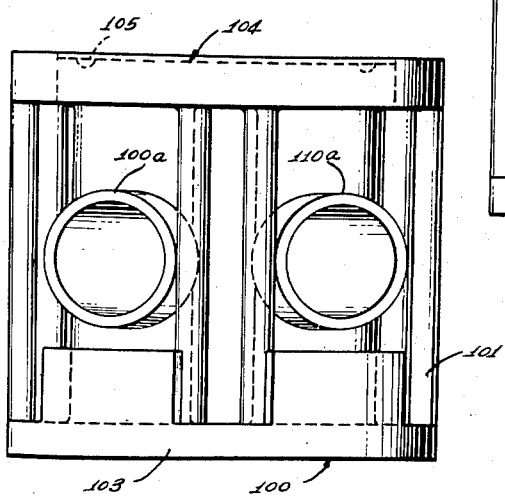
FIG. 10 is a view looking toward the left in FIG. 9.

Vertical thermal expansion and contraction stresses in the individual cylinder heads 73 may be eliminated by use of the improvements shown in FIGS. 8–10. Here, the individual cylinder head 100 is substantially as in FIGS. 1–5, but the stress rods are omitted therefrom, and substituted for by stress rods 101 depending from a top ring 102 understood to be engaged by pressure plate 57, the lower ends of the rods 101 engaging the bottom wall 103 of the head 100. The rods 101 are so spaced as to fit around the port tubes 100a of the head. The top wall 104 of head 100 is slidably accommodated inside ring 102, terminates shortly below the upper plane of the latter, and is sealed to the pressure plate by O-ring seal 105. This arrangement permits compression of the lower head wall against the top of the cylinder wall, but permits certain vertical expansion and contraction of the head structure, freeing it from vertical thermal stress.

Figure 6:
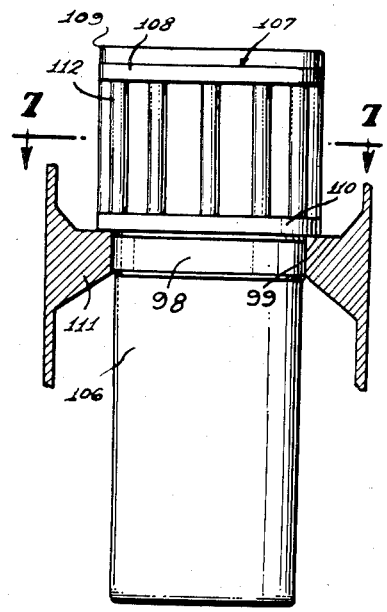
FIG. 6 shows a modified arrangement in the engine of FIGS. 1, 2 and 5.
Figure 5:
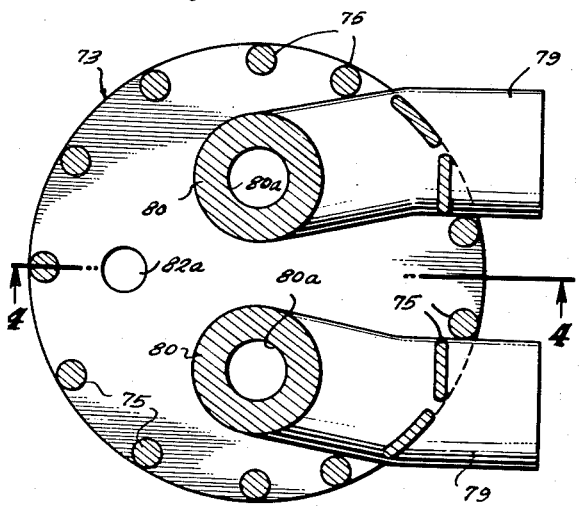
FIG. 5 is a section taken on line 5—5 of FIG. 4.
Figure 7:
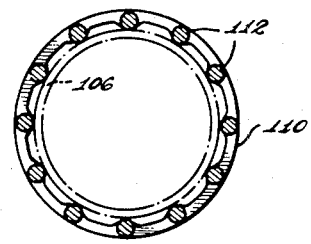
FIG. 7 is a transverse section taken on line 7—7 of FIG. 6.

Vertical thermal stress in the upper portion of the cylinder sleeve may be reduced by the improvements shown in FIGS. 6 and 7. Here, the cylinder sleeve 106 has no seating flange corresponding to flange 64 of FIG. 2. A stud or rod frame 107 has an upper ring 108 engaging under upper end cylinder flange 109, a lower end ring 110 seating on block annulus 111, and interconnecting liquid cooled stress rods or studs 112. Thus the pressure from above is transmitted from cylinder flange 109 to the stud frame, and from the stud frame to the block, while the cylinder sleeve is free for vertical thermal expansion by sliding through annulus 111.

FIGS. 11–13 shows an application of the invention to an L-head engine. Rising from crackcase 130 is L-head block 131 formed with individual, coolant-filled cylinder compartments 132. The offset portion 133 of the block has a lower horizontal wall 134, and coplanar with the upper surface thereof is a ledge 135 surrounding the interior of the leg 136 of the block. This ledge 135 is formed with a vertical bore 137 slidably receiving the machined, slightly enlarged medial portion 138 of cylinder sleeve 139, and provides an upwardly facing seating shoulder 140 engaged by medial cylinder sleeve supporting flange 141. The lower end of sleeve 139 is slidably received and sealed in lower head wall 142, in the manner of FIGS. 1–3.

The upper portion of cylinder sleeve 139 has a lateral projection, as shown, to accommodate L-head valve and port tube arrangements. Thus, the exterior flange 143 at the upper end of sleeve 139 is extended laterally on one side, as at 143a, and formed therein, side by side, are valve seats 144. Port tubes 145 formed integrally with flange extension 143, around valve seats 144, extend downwardly for a distance, and then turn outward, their horizontally disposed extremities being coupled to exterior manifolds 146 by connecting means 147, which may be of the type shown in FIGS. 1–3, with clearance spaces, or expansion junctions, at the ends of the tubes to accommodate the small thermal expansion and contraction that may occur at these points. Extending downward from the port tubes 145 are tubular members 150 adapted to receive valve guide bushings, not shown, and these members 150 are flanged at the bottom, as at 151, and seated on wall 134, being sealed to the latter as at 152. The flange portions 151 are integrally joined to the medial portion of the cylinder sleeve, and coolant space 153 is afforded between the port tubes and members 150 and the cylinder sleeve, as shown.

Below tubular members 150, and adjacent the crankcase, the block has a portion 155 formed with valve lifter guide bores 156, as shown.

An individual cylinder head 158 has a peripheral flange 159 seated, through gasket 160, on the periphery of cylinder sleeve flange 143, and has a top wall 161 forming combustion chamber space 162.

A tubular boss 163 extends upwardly from combustion chamber wall 162 to a level slightly above the upper plane of the block, and has a bore 164 and a reduced threaded bore 165 for accommodation of a spark plug, not shown. A plurality of vertical stress supporting rods or studs 166 rise from the periphery of head flange 159 to the same level as boss 163, i.e., to slightly above the upper plane of the block, and a pressure plate 167, of which there is one for each cylinder compartment, engages the boss 163 and the upper ends of studs 166. This pressure plate 167 is secured to the block by studs 168, being sealed to the block by O-ring seal 169, and to boss 163 by O-ring seal 163a. Thus, the cylinder head and cylinder sleeve are pressed downwardly, by setting up of studs 168, with vertical support being provided by ledge 135 and wall 134, in the general manner of FIGS. 1–3. Both the individual head 158 and the highly heated upper end portion of the cylinder sleeve are mechanically isolated and free for substantially unrestrained lateral thermal expansion and contraction. The port tubes join their connectors to the external manifolds at a level substantially below and at a substantial distance from the high heat region immediately surrounding the combustion chamber, and, moreover, are reduced in temperature by the surrounding coolant. Still further, the clearance at the extremities of the port tubes within the connectors 147 (as in FIG. 3) accommodates any small thermal expansion that might occur within the port tubes. The high heat region of the cylinder sleeve, including the valve seat projection thereof, is thus effectually isolated from the block and completely free for unhindered thermal expansion in all lateral directions. Assurance is thereby provided that distortions of the valve seats to out-of-round shape as a consequence of thermal expansion will not occur.

FIGS. 14–17 show a modification of the L-head engine of FIGS. 11–13. Much of the structure of FIGS. 14–17 is identical to that of FIGS. 11–13, and similar components will, therefore, be identified by corresponding reference numerals, and a description of these parts will not be repeated. The modification of FIGS. 14–17 comprises a stud frame, having a purpose like that of FIG. 6, for assuming the vertical stress applied to the upper end of the cylinder sleeve through the cylinder head from the pressure plate 167, and transmitting it to the cylinder block ledge 135, leaving the cylinder sleeve free for vertical thermal expansion.

The stud frame comprises a plurality of vertical studs or rods 170, connected a short distance below their upper ends by a frame 171, and a short distance above their lower ends by a second frame 172. The frame 171 is shaped to underlie the upper end cylinder sleeve flange 143, and is interrupted at the end thereof adjacent the port tubes to accommodate the port tubes during assembly. The upper ends of the studs engage under the sleeve flange 143, and a single stud 173 rising from lower frame 172 passes between the port tubes and also engages under flange 143.

The lower frame 172 has a ring portion 174 overlying ledge 135 and an extension 175 overlying wall 134. The valve guide tubes 150a are in this case not flanged at their lower ends, and are unconnected at their lower ends with the cylinder sleeve, and are slidably received in apertures 176 formed in lower frame extension 175. The lower ends of the rods or studs 170 engage ledge 135 and wall 134.

The cylinder sleeve 139 in this case does not have a medial supporting flange, such as flange 141 of FIG. 12, and has a portion 136a slidable through ledge 135 to accommodate vertical thermal expansion. The cylinder sleeve thus operates unstressed from end to end under heated running conditions.

Figure 18:
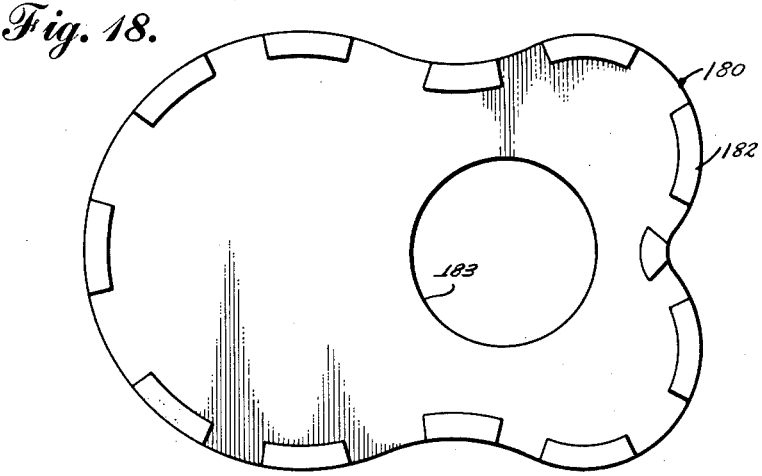
FIG. 18 is a bottom plan view of a stress supporting frame useful in a modified form of the engine of FIGS. 11–13.
Figure 19:
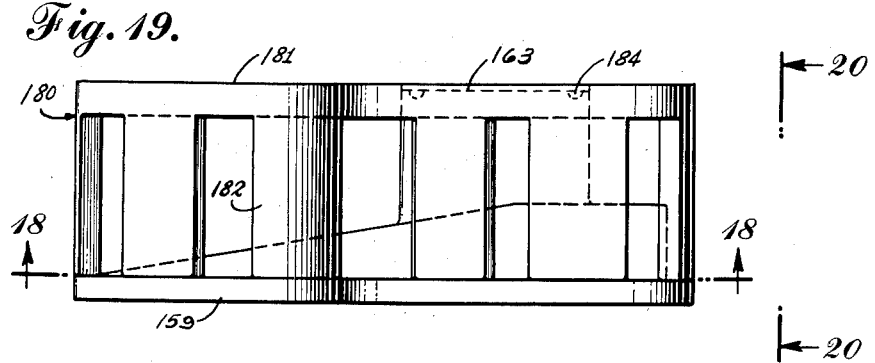
FIG. 19 shows the frame of FIG. 18 in its relationship to the combustion chamber head.
Figure 20:
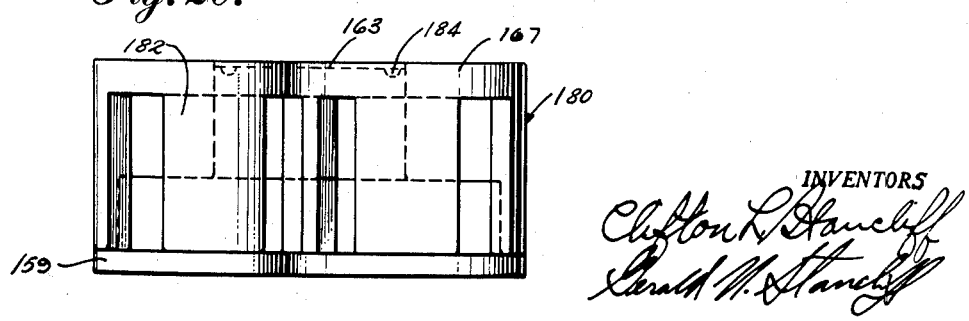
FIG. 20 is a view taken in accordance with the arrows 20—20 of FIG. 19.
Figure 25:
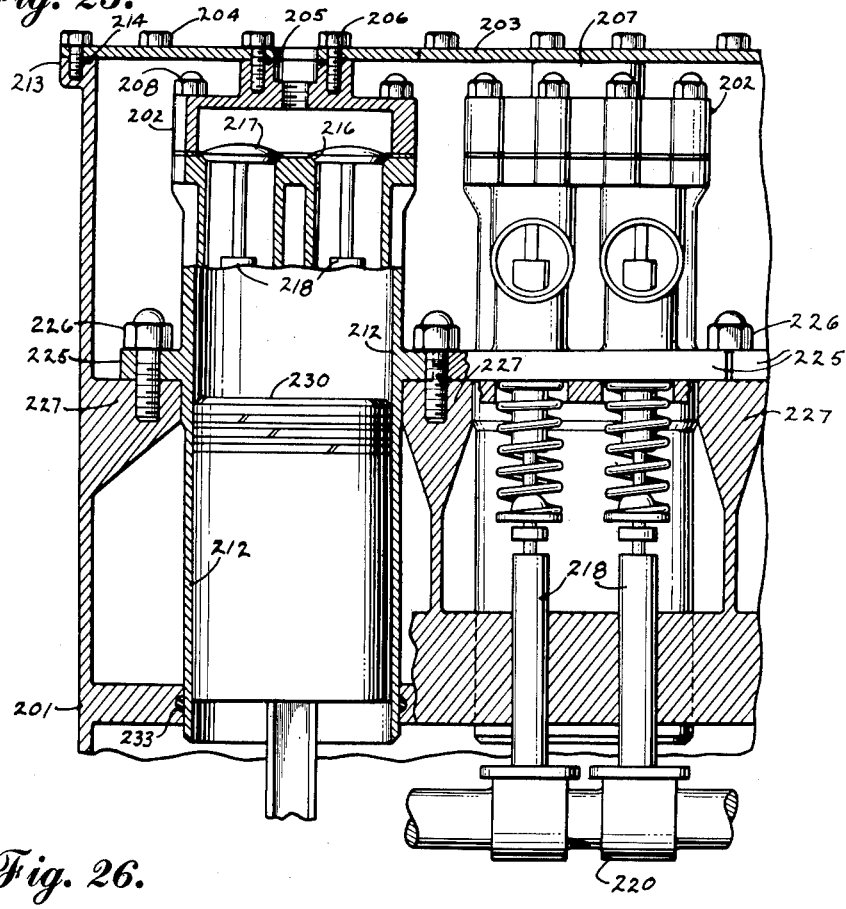
FIG. 25 is a section taken on broken line 25—25 of FIG. 22.

FIGS. 18–20 disclose a further modification of FIGS. 11–13, comprising a liquid-cooled stress frame 180 for transmitting pressure from the pressure plate 167 of FIG. 12, for instance, to the peripheral flange 159 of individual cylinder head 158. The stress frame 180 comprises an upper wall 181 engageable by pressure plate 167 (of FIG. 12), and depending legs 182 spaced about the periphery thereof and engageable with flange 159. The cylinder head 158 is in this case without stress rods or studs, and its spark plug boss is slidably receivable in an aperture 183 in frame wall 181, and terminates just below the upper plane of wall 181, being sealed to the pressure plate by O-ring seals 184. It will be appreciated that the device of FIGS. 18–20 serves the same function in the L-head engine of FIGS. 11–13 as does the stud frame of FIGS. 8–10 in the valve-in-head engine of FIGS. 1–3.

In FIGS. 21 to 27 is shown a method of securing our removable L-head and combination cylinder wet sleeve and valve components by a system of bolts fastened to supporting bosses located below the hotter areas of the cylinder. In FIG. 21, 201 indicates the engine frame or block surrounding an individual cylinder head 202 with the cover plate removed while the adjoining cylinder shows the cover plate 203 secured to the engine frame by bolts 204. Sparg plug aperture 205 is surrounded by bolts 206 which engage and hold a spark plug housing 207 to the cover plate 203. The individual cylinder head 202 is tightly pressed by bolts 208 and bosses 209 against a gasket 210 positioned on the top rim 211 of wet cylinder sleeve 212. Spark plug housing 207 and the top rim or flanges 213 of engine frame 201 are leak-proofed by liquid tight O-rings 214 and 215 from the cover plate 203. Wet sleeve casting 212 is integrally cast with valve seat 216 in which operates valve 217 sliding in valve guide 218 of valve port tube 219, all of which are activated by valve cam 220. In valve mechanism chamber 228 is located valve rod 229 operated by valve cam 220. Valve port 219 is sealed by means of packing gland 221 tightly secured by bolts 222, and manifold 223 is also secured to the engine frame 201 by bolts 222. A clearance space 219a is provided between the ends of the port tubes 219 and the adjacent wall of the block to accommodate the slight expansion that may occur at this point. Cylinder sleeve 212 is provided with a bolt mounting and positioning flange or ring 225 having provisions for securing it by means of bolts 226 to engine frame positioning and bolting ledge 227.

Figure 26:
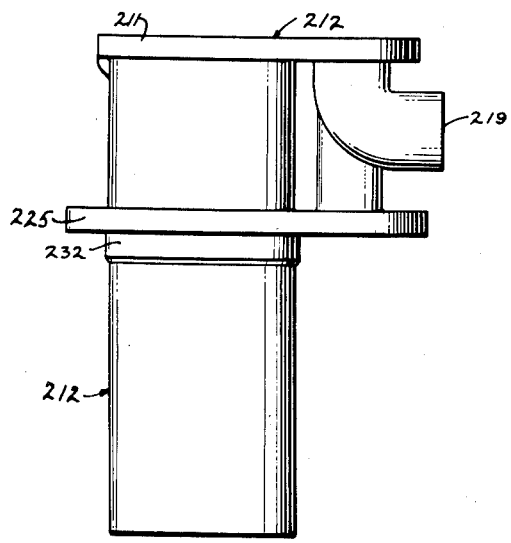
FIG. 26 is a detailed view of the cylinder sleeve and auxiliary components integral therewith of the engine of FIGS. 21–25.
Figure 27:
FIG. 27 is a side elevation view of the combustion chamber head shown in FIGS. 21–25.

In FIG. 26, 212 indicates the unitary wet sleeve and combined valve and component parts in which 211 is the top rim or flange and 232 is the sleeve side aligning annular ring. In FIGS. 25-27, 225 designates the cylinder stop and positioning bolt ring or flange and 226 the fastening bolts to secure the cylinder to the engine frame positioning and bolting bosses 227. Numeral 233 indicates O-ring gaskets provided for liquid-proofing the unitary wet sleeve 212 from the engine frame 201.

In FIGS. 28-30 is shown the adaptation of our bolted type of removable cylinder sleeve and removable cylinder head construction to a T-type engine in which 234 indicates the engine crankcase to which is bolted the cylinder sleeve and head enclosure block 235, and to which is, in turn, secured by bolts 236, cover plate 237, leak-proofed by O-ring gaskets 238. A valve rocker arm 239 is secured by bearing bracket 240 and bolts 241 to cover plate 237. T-head 242 is unitarily formed with valve guide housing or tubes 243 leak-proofed by liquid-tight O-ring gaskets 238 and in which are located valve guides 244 and valve stems 245. T-head 242 is also provided with valve seats 246 to which are unitarily formed valve port tubes 247 and 248. Liquid cooled packing gland 250 forces packing 251 by means of packing gland flange 252 into a leak-proof connection by means of tightly stressed bolts 253 and surrounding packing 251 and forms a liquid coolant circulation channel 254. Clearance spaces 247a are provided at the ends of the port tubes, as shown, to form expansion joints at these points. Manifold flanges 255 and 256 are tightly secured to cylinder sleeve and head enclosure 235 by means of bolts 257. Rim 258 of T-head 242 is clamped securely against the top edge or flange 259 of cylinder sleeve 260 by means of bolts 261, with a separating gasket 262 all forming a jointure surrounded by a liquid coolant channel 263. Numeral 264 designates a spark plug aperture formed in the side of T-head 242 and in order to allow removal of the T-head, as well as movement to avoid any possibility of resisting lateral thermal expansion of head 242, it is provided with a sleeve 265 slidingly movable in and leak-proofed by packing gland 266 and tightly clamped packing 267 which are removably secured in cylinder sleeve and head enclosure 235. Below the hot upper area of the cylinder sleeve 260 is formed a positioning and stop bolt ring flange 268 which rests on and is securely fastened by bolts 269 to the crankcase positioning and bolting ledge 270. Near the bottom of the cylinder sleeve 260 are provided O-ring gaskets 271 and 272 to leak-proof the cylinder sleeves 260 against the cylinder sleeve and head enclosure 235.

It will be noted that in the embodiment of FIGS. 28-30, the individual cylinder heads are mechanically isolated from the block at the level of the combustion chamber, excepting at one point on the periphery, where the spark plug tube 265 is slidingly fitted in the wall of the block. This single point connection does not tend to restrain uniform thermal lateral expansion of the head for several reasons, among which is the fact that a single point of connection cannot cause an out-of-round or elliptical distortion the same as would two diametrically opposite points of support, for example, and the further fact that the single connecting element, i.e., the spark plug tube 265, is afforded capability for longitudinal movement through the side wall of the block. The combustion chamber head is, again, therefore, isolated from the block, in the sense that it is free for unrestrained thermal lateral expansion relative to the block. The port tubes 247 are also, as in earlier embodiments, provided with clearances at their ends, such as to permit any slight expansion that might occur at these points.

FIG. 31 shows an integral inbuilt overhead cylinder block with a liquid coolant chamber provided for a removable cylinder head in which numeral 314 designates the unitary cylinder block to which is suitably attached a cover plate 315. Numeral 319 designates an inbuilt cylinder attached to unitary cylinder block 314 by means of connecting webs 316 located below the hot upper area of the cylinder. Numeral 321 designates the top rim flange of cylinder 319 which is located below the extended side walls 323 of cylinder block 314 in order to accommodate a removable, individual cylinder head adapted to seat thereon. Numeral 322 indicates a push rod chamber and 317 a liquid coolant chamber surrounding the lower portions of cylinder 319. Numeral 318 indicates a liquid coolant chamber surrounding the upper portion of cylinder 319 and which is open, by way of a slot 320 entirely surrounding the cylinder top rim flange 321, with the coolant space above, thus separating and isolating the cylinder from the side of the integral unitary cylinder block 314.

FIG. 32 indicates an integral inbuilt L-head type unitary block casting including cylinders and attached component parts with an enclosure for removably mounted individual cylinder heads and in which the numeral 344 indicates an L-head type cylinder and cylinder head block provided with a suitably attached cover plate 345. Inbuilt cylinder 346 is attached to cylinder head block 344 by means of connecting webs 347 located below the hot upper area of the cylinder 346. A liquid coolant chamber 348 partially surrounds the lower end of cylinder 346, while liquid coolant chamber 349 surrounds the upper portion of combined cylinder 346. The top rim flange 350 of the cylinder surrounds the cylinder and valve seat 351, and is located below the upper end of the extended side wall 354 of cylinder block 344 so as to provide a space 355 for accommodation of a removable head, not shown. A slot 356 opens from space 355 into liquid coolant chamber 349 and entirely surrounds the cylinder and valve seat top rim flange 350 which is thus separated and isolated from the sides of the integrally formed unitary L-head cylinder block 344. Port tubes 352 and valve rod guide means 353 are provided, as shown.

In general, our invention involves the following peculiar construction features, one or all of which may be incorporated in a specific engine design.

Of prime consideration in formulating a design following the lines of our invention, in most of its forms, are the features of an individually removable head and an individually removable cylinder, involving effectual thermal and mechanical isolation of both the head and the cylinder in and around the general plane of jointure. This feature ideally contemplates an unbridged or unconnected circumferential area around and in the plane of the jointure. By confining the highly heated parts to the jointure areas and by eliminating or very materially restricting contact with a colder side bridging or connecting section, conflicting thermal stresses tending to destroy the value of the structural material are prevented or reduced, and tendencies toward forcing the valve seats out-of-round by reason of thermal stresses are avoided. In some instances, there may be a bridging connection between the head or cylinder and the block on one side, but in such cases, there is either no such bridging connection on the opposite side, or the bridging connection is provided with an expansion joint, or both, so that neither the hot and expanded head nor the upper end portion of the cylinder sleeve are effectually or materially confined and supported by colder block structure against freedom for expansion. Stresses which might otherwise cause distortion of valve seats are thus avoided.

A general feature of similar prime importance to the overall utilization of our invention is that of positioning the main attachment point of the cylinder to the housing or frame at a lower location than the top of the combustion chamber. This lowering of the attachment point not only realizes isolation of the top of the cylinder and obtains the advantage of lower heat expansion and heat contraction incident to a zone of low thermal characteristics, but also best opposes excessive vibration and crankshaft side thrust. If it is desired to utilize not only our system of minimizing horizontal thermal distortion arising from severe temperature gradients but also reduce the vertical thermal conflicting expansion and contraction effects, the design should include our liquid cooled stress supporting stud frames for the cylinder and the head in combination or separately, either one or the other, as desired.

It will be understood that while the forms of our removable and thermal stress resistant liquid cooled internal combustion engines herein schematically illustrated and described are to be considered as preferred and typical embodiments of our invention, we do not limit ourselves to the precise constructions and combinations as disclosed, but reserve the right to resort to and substitute various adaptations, modifications and changes in design, shape, size and arrangement of parts and substances without departing from the spirit of our invention or the scope of our claims, as described and indicated above and in the drawings and the following claims:

What is claimed is:

1. In a liquid cooled internal combustion engine, the combination of: an engine block including walls defining a liquid coolant chamber, an individual cylinder sleeve inside said chamber, said sleeve having an upper end portion forming a combustion chamber and provided therearound with an upwardly presented compression sealing end face, an individual cylinder head in said coolant chamber for said sleeve including a combustion chamber head wall having a peripheral, downwardly presented compression sealing face axially opposed to and mating said sealing end face on said upper end portion of said sleeve, said upper combustion chamber end of said sleeve and said combustion chamber head wall of said cylinder head being mechanically isolated from said block, whereby to freely accommodate thermal expansion thereof in directions transverse to the cylinder sleeve, said engine block walls defining an opening into said coolant chamber in end alignment with and circumscribing said cylinder head and sleeve, a closure plate for said opening positioned above said cylinder head, securing means for forcing said closure plate toward said block walls in a direction axial of said sleeve, a water seal between said closure plate and said walls around said opening, said closure plate engaging the top of said cylinder head for pressing said opposed sealing faces on said head and sleeve into compression sealing engagement, and means for axially supporting said sleeve from said block from a portion thereof spaced a substantial distance from the upper end of said cylinder sleeve, said supporting means resisting downward force exerted by said closure plate against said head and sleeve.

2. In a liquid cooled internal combustion engine, the combination of: an engine block including walls defining a liquid coolant chamber, an individual cylinder sleeve inside said chamber, said sleeve having an upper end portion forming a combustion chamber and provided therearound with an upwardly presented compression sealing end face, an individual cylinder head in said coolant chamber for said sleeve including a combustion chamber head wall having a peripheral, downwardly presented compression sealing face axially opposed to and mating said sealing end face on said upper end portion of said sleeve, said sleeve and combustion chamber head wall being structurally arranged for substantially unrestricted thermal expansion relative to said block in all directions transverse to said sleeve at the high heat region at the level of said combustion head wall and the upper end portion of said sleeve, said engine block walls defining an opening into said coolant chamber in end alignment with and circumscribing said cylinder head and sleeve, a closure plate for said opening positioned above said cylinder head, securing means for forcing said closure plate toward said block walls in a direction axial of said sleeve, a water seal between said closure plate and said walls around said opening, said closure plate engaging the top of said cylinder head for pressing said opposed sealing faces on said head and sleeve into compression sealing engagement, and means for axially supporting said sleeve from said block from a portion thereof spaced a substantially distance from the upper end of said cylinder sleeve, said supporting means resisting downward force exerted by said closure plate against said head and sleeve.

3. In a liquid cooled internal combustion engine, the combination of: an engine block including walls defining a liquid coolant chamber, an individual cylinder sleeve inside said chamber, said sleeve having an upper end portion forming a combustion chamber and provided therearound with an upwardly presented compression sealing end face, an individual cylinder head in said coolant chamber for said sleeve including a combustion chamber head wall having a peripheral, downwardly presented compression sealing face axially opposed to and mating said sealing end face on said upper end portion of said sleeve, said upper combustion chamber end of said sleeve and said combustion chamber head wall of said cylinder head being mechanically isolated from said block, whereby to freely accommodate thermal expansion thereof in directions transverse to the cylinder sleeve, said engine block walls defining an opening into said coolant chamber in end alignment with and circumscribing said cylinder head and sleeve, a closure plate for said opening positioned above said cylinder head, securing means for forcing said closure plate toward said block walls in a direction axial of said sleeve, a water seal between said closure plate and said walls around said opening, means separate of said cylinder head for transmitting pressure from said closure plate to said combustion chamber head wall of said cylinder head for pressing said sealing faces on said head and sleeve into compression sealing engagement, and means for axially supporting said sleeve from a portion of said block spaced a substantial distance from the upper end of said cylinder sleeve, said supporting means resisting downward force exerted by said pressure transmitting means on said head and cylinder.

4. In a liquid cooled internal combustion engine, the combination of: an engine block including walls defining a liquid coolant chamber, an individual cylinder sleeve inside said chamber, said sleeve having an upper end portion forming a combustion chamber and provided therearound with an upwardly presented compression sealing end face, an individual cylinder head in said coolant chamber for said sleeve including a combustion chamber head wall having a peripheral, downwardly presented compression sealing face axially opposed to and mating said sealing end face on said upper end portion of said sleeve, said sleeve and combustion chamber head wall being structurally arranged for substantially unrestricted thermal expansion relative to said block in all directions transverse to said sleeve at the high heat region at the level of said combustion head wall and the upper end portion of said sleeve, said engine block walls defining an opening into said coolant chamber in end alignment with and circumscribing said cylinder head and sleeve, a closure plate for said opening positioned above said cylinder head, securing means for forcing said closure plate toward said block walls in a direction axial of said sleeve, a water seal between said closure plate and said walls around said opening, said closure plate being adapted and arranged for exertion of pressure on said combustion chamber head wall of said cylinder head for pressing said sealing faces on said head wall and sleeve into compression sealing engagement, and means for axially supporting said sleeve from a portion of said block spaced a substantial distance from the upper end of said cylinder sleeve, said supporting means resisting downward force exerted by said pressure transmitting means on said head and cylinder.

5. The subject matter of claim 4, wherein said cylinder head includes a top plate adapted to be engaged and held under pressure by said closure plate, and a plurality of stress-transmitting struts interconnecting said top plate with said combustion chamber head wall.

6. The subject matter of claim 4, including a pressure transmitting means comprising a plurality of stress-transmitting struts separate of said head acting between said closure plate and said combustion chamber head wall.

7. The subject matter of claim 4, wherein said cylinder sleeve has a downwardly facing shoulder at its upper end, support means engaging said shoulder and extending downwardly therefrom, and an upwardly facing shoulder on said block engaging the bottom of said support means, said cylinder sleeve being longitudinally movable with thermal expansion relative to said upwardly facing shoulder.

8. The subject matter of claim 4, wherein said cylinder sleeve has an external flange at its combustion chamber end, an annulus engaging under said flange, a plurality of struts extending downwardly from said flange, an annulus on the lower ends of said struts, and an upwardly facing shoulder on said block engaging under said last-mentioned annulus.

9. In a liquid cooled internal combustion engine, the combination of: an engine block including walls surrounding a liquid coolant chamber for a cylinder sleeve, a cylinder sleeve inside said chamber, said sleeve having a combustion chamber end including a laterally projecting valve seat portion, an individual cylinder head in said coolant chamber for said cylinder sleeve including a combustion chamber head wall engaging and compression sealed to said combustion chamber end of said sleeve outside said laterally projecting valve seat portion, studs securing said combustion chamber head wall of said individual head to said combustion chamber end of said sleeve, support means on said block within said coolant chamber for radially and axially supporting a region of said sleeve spaced a substantial distance from said combustion chamber end of said sleeve, means for securing said sleeve to said support means, said engine block walls surrounding said coolant chamber having an access opening at the top of said chamber, a closure for said opening, means for securing said closure to said engine block walls around said opening, said combustion chamber end of said cylinder sleeve and said combustion chamber head wall being peripherally mechanically isolated from said block.

10. In a liquid cooled internal combustion engine, the combination of: an engine block including walls surrounding a liquid coolant chamber for a cylinder sleeve, a cylinder sleeve inside said chamber, said sleeve having a combustion chamber end including a laterally projecting valve seat portion, an individual cylinder head in said coolant chamber for said cylinder sleeve including a combustion chamber head wall engaging and compression sealed to said combustion chamber end of said sleeve outside said laterally projecting valve seat portion, studs securing said combustion chamber head wall of said individual head to said combustion chamber end of said sleeve, support means on said block within said coolant chamber for radially and axially supporting a region of said sleeve spaced a substantial distance from said combustion chamber end of said sleeve, said engine block walls surrounding said coolant chamber having an access opening at the top of said chamber, a closure for said opening, means for securing said closure to said engine block walls around said opening, a spark plug boss on said combustion chamber head wall engaged by said closure, and studs for securing said closure to said boss, said combustion chamber end of said cylinder sleeve and said combustion chamber head wall being peripherally mechanically isolated from said block.

11. In a liquid cooled internal combustion engine, the combination of: an engine block including walls defining a liquid coolant chamber, said walls having an upper edge, a cylinder sleeve inside said chamber, said sleeve having an upper end combustion chamber portion and being provided therearound with a sealing face, an individual cylinder head in said coolant chamber for said sleeve including a combustion chamber head wall in fixed pressure engagement with the upper end portion of said sleeve and having a peripheral sealing face mating said sealing face on said upper end portion of said sleeve, said sleeve and combustion chamber head wall being effectually isolated from said block at the high heat region at the level of said head wall and combustion chamber extremity of said sleeve, such as to freely accommodate thermal expansion thereof in all directions transverse to the cylinder sleeve, means for supporting said sleeve from a portion of said block spaced substantially from said combustion chamber end of said sleeve, and a top closure wall for said coolant chamber over and separate of said individual cylinder head, said closure wall opposing and being liquid sealed to said upper edge of said coolant-chamber-defining walls.

12. In a liquid cooled internal combustion engine, the combination of: an engine block including walls defining a liquid coolant chamber, said walls having an upper edge, a cylinder sleeve inside said chamber, said sleeve having an upper end combustion chamber portion and being provided therearound with a sealing face, an individual cylinder head in said coolant chamber for said sleeve including a combustion chamber head wall in fixed pressure engagement with the upper end portion of said sleeve and having a peripheral sealing face mating said sealing face on said upper end portion of said sleeve, means for supporting said sleeve from a portion of said block spaced substantially from said combustion chamber end of said sleeve, and a top closure wall for said coolant chamber over and separate of said individual cylinder head, said closure wall opposing and being liquid sealed to said upper edge of said coolant-chamber-defining walls, said sleeve and combustion chamber head wall being structurally arranged for substantially unrestricted thermal expansion relative to said block and to said top closure wall at the high heat region at the level of said combustion chamber head wall and the combustion chamber portion of said sleeve.

13. In a liquid cooled internal combustion engine, the combination of: an engine block including walls defining a liquid coolant chamber, said walls having an upper edge, a cylinder sleeve inside said chamber, said sleeve having an upper end combustion chamber portion and being provided therearound with an upwardly presented compression sealing end face, an individual cylinder head in said coolant chamber for said sleeve including a combustion chamber head wall having a peripheral, downwardly presented compression sealing face axially opposed to and mating said sealing end face on said upper end portion of said sleeve, a top closure wall for said coolant chamber over and separate of said individual cylinder head, said closure wall opposing and being liquid sealed to said upper edge of said coolant-chamber-defining walls, said closure wall acting downwardly on said head to compress said sealing face thereof against said sealing end face of said cylinder, said sleeve and combustion chamber head wall being effectually laterally isolated from said block and said closure wall at the high heat region at the level of said head wall and combustion chamber portion of said sleeve, such as to freely accommodate thermal expansion thereof in all directions transverse to the cylinder sleeve, and means for supporting said sleeve against downward forces from a portion of said block spaced a substantial distance from said upper end portion of said sleeve, said supporting means resisting downward pressure exerted on said head and sleeve by said closure wall.

14. In a liquid cooled internal combustion engine, the combination of: an engine block including walls defining a liquid coolant chamber, said walls having an upper edge, a cylinder sleeve inside said chamber, said sleeve having an upper end combustion chamber portion and being provided therearound with an upwardly presented compression sealing end face, an individual cylinder head in said coolant chamber for said sleeve including a combustion chamber head wall having a peripheral, downwardly presented compression sealing face axially opposed to and mating said sealing end face on said upper end portion of said sleeve, a top closure wall for said coolant chamber over and separate of said individual cylinder head, said closure wall opposing and being liquid sealed to said upper edge of said coolant-chamber-defining walls, said closure wall acting downwardly on said head to compress said sealing face thereof against said sealing end face of said cylinder, and means for supporting said sleeve against downward forces from a portion of said block spaced a substantial distance from said upper end portion of said sleeve, said supporting means resisting downward pressure exerted on said head and sleeve by said closure wall, said sleeve and combustion chamber head wall being structurally arranged for substantially unrestricted thermal expansion relative to said block and to said top closure wall at the high heat region at the level of said combustion chamber head wall and the combustion chamber portion of said sleeve.

15. In a liquid cooled internal combustion engine, the combination of: an engine block including walls defining a liquid coolant chamber, said walls having an upper edge, a cylinder sleeve inside said chamber, said sleeve having an upper end combustion chamber portion and being provided therearound with an upwardly presented compression sealing end face, an individual cylinder head in said coolant chamber for said sleeve including a combustion chamber head wall having a peripheral, downwardly presented compression sealing face axially opposed to and mating said sealing end face on said upper end portion of said sleeve, a top closure wall for said coolant chamber over and separate of said individual cylinder head, said closure wall opposing and being liquid sealed to said upper edge of said coolant-chamber-defining walls, studs securing said combustion chamber head wall of said cylinder head to said cylinder sleeve, and means supporting said sleeve from a portion of said block spaced a substantial distance from said combustion chamber portion of said block, said sleeve and combustion chamber head wall being structurally arranged for substantially unrestricted thermal expansion relative to said block and to said top closure wall at the high heat region at the level of said combustion chamber head wall and the combustion chamber portion of said sleeve.

16. The subject matter of claim 11, wherein the engine is of the valve-in-head type, and said combustion chamber head wall has valve seats and ports therethrough, port tubes surrounding said ports and extending from said head wall, and means including thermal expansion joints for continuing said port tubes through a wall of the coolant chamber.

17. In a liquid cooled internal combustion engine, the combination of: an engine block including walls defining a liquid coolant chamber, said walls having an upper edge, a cylinder sleeve inside said chamber, said sleeve having an upper end combustion chamber portion and adjacent thereto, a laterally projecting portion formed with upwardly facing valve seats and ports therethrough, an upwardly presented compression sealing end face on the upper end of said sleeve circumscribing the bore of said sleeve and said valve seats, an individual cylinder head in said coolant chamber for said sleeve including a combustion chamber head wall having a peripheral, downwardly presented compression sealing face axially opposed to and mating said sealing end face on said upper end portion of said sleeve, a top closure wall for said coolant chamber over and separate of said individual cylinder head, said closure wall opposing and being liquid sealed to said upper edge of said coolant-chamber-defining walls, said sleeve and combustion chamber head wall being structurally arranged for substantially unrestricted thermal expansion relative to said block and to said top closure wall at the high heat region at the level of said combustion chamber head wall and the combustion chamber portion of said sleeve, and means for supporting said sleeve from a portion of said block spaced substantially from said combustion chamber end of said sleeve.

18. The subject matter of claim 4, wherein said cylinder head includes a top plate adapted to be engaged and held under pressure by said closure plate, and compressional stress-transmitting structure interconnecting said top plate with said combustion chamber head wall.

References Cited in the file of this patent

UNITED STATES PATENTS

| | | |
|---|---|---|
| 1,156,312 | Regenbogen et al. | Oct. 12, 1915 |
| 2,066,580 | Severin et al. | Jan. 5, 1937 |
| 2,250,376 | Hemmingsen | July 22, 1941 |

FOREIGN PATENTS

| | | |
|---|---|---|
| 255,606 | Great Britain | July 29, 1926 |
| 498,603 | Great Britain | Jan. 9, 1939 |
| 701,400 | France | Jan. 7, 1931 |